J. HARTNESS.
CHIP CONTROLLING MEANS FOR METAL-CUTTING TOOLS.
APPLICATION FILED SEPT. 17, 1908.
1,036,102.
Patented Aug. 20, 1912.
2 SHEETS—SHEET 1.
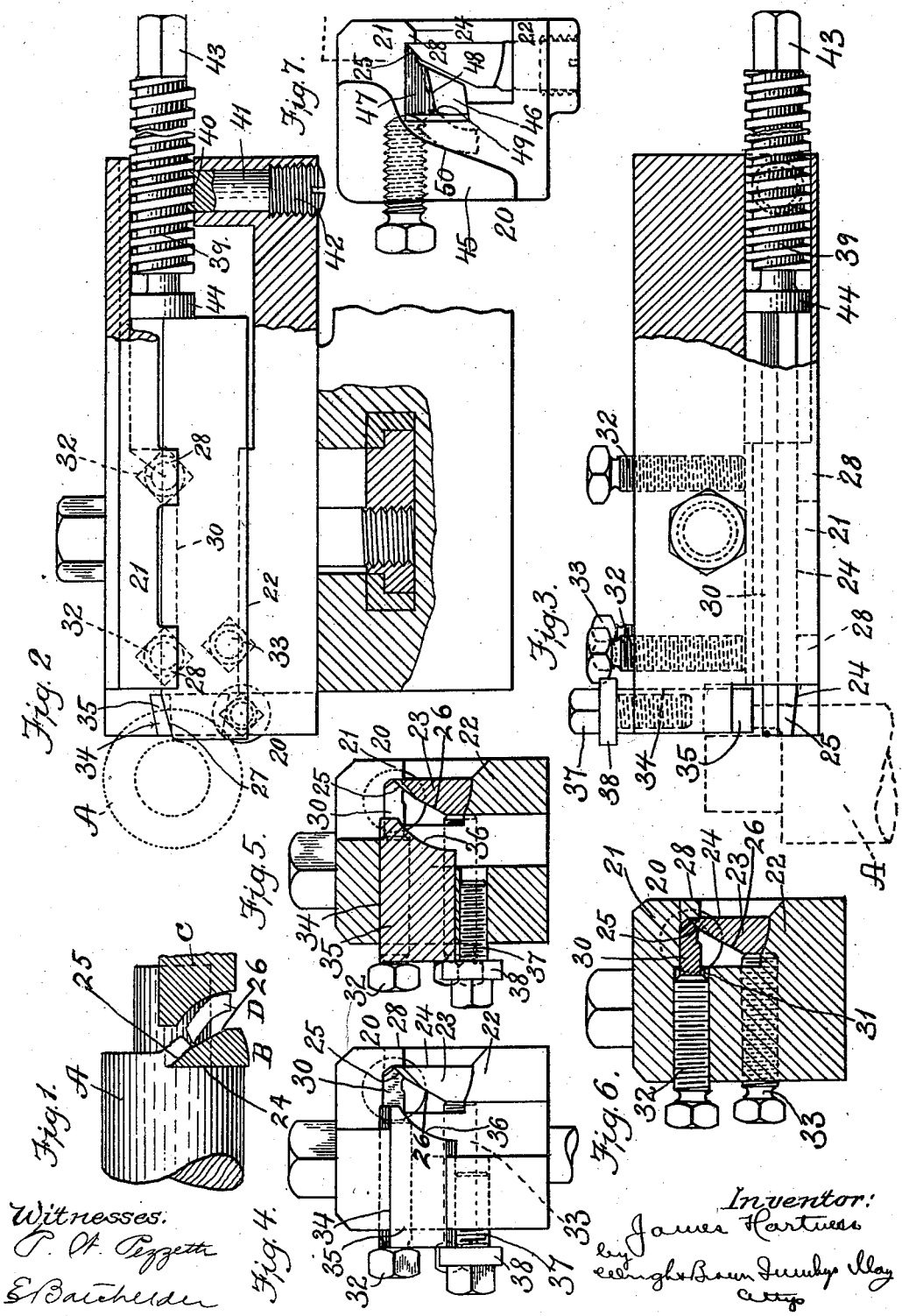

J. HARTNESS.
CHIP CONTROLLING MEANS FOR METAL CUTTING TOOLS.
APPLICATION FILED SEPT. 17, 1908.
1,036,102.
Patented Aug. 20, 1912.
2 SHEETS—SHEET 2.
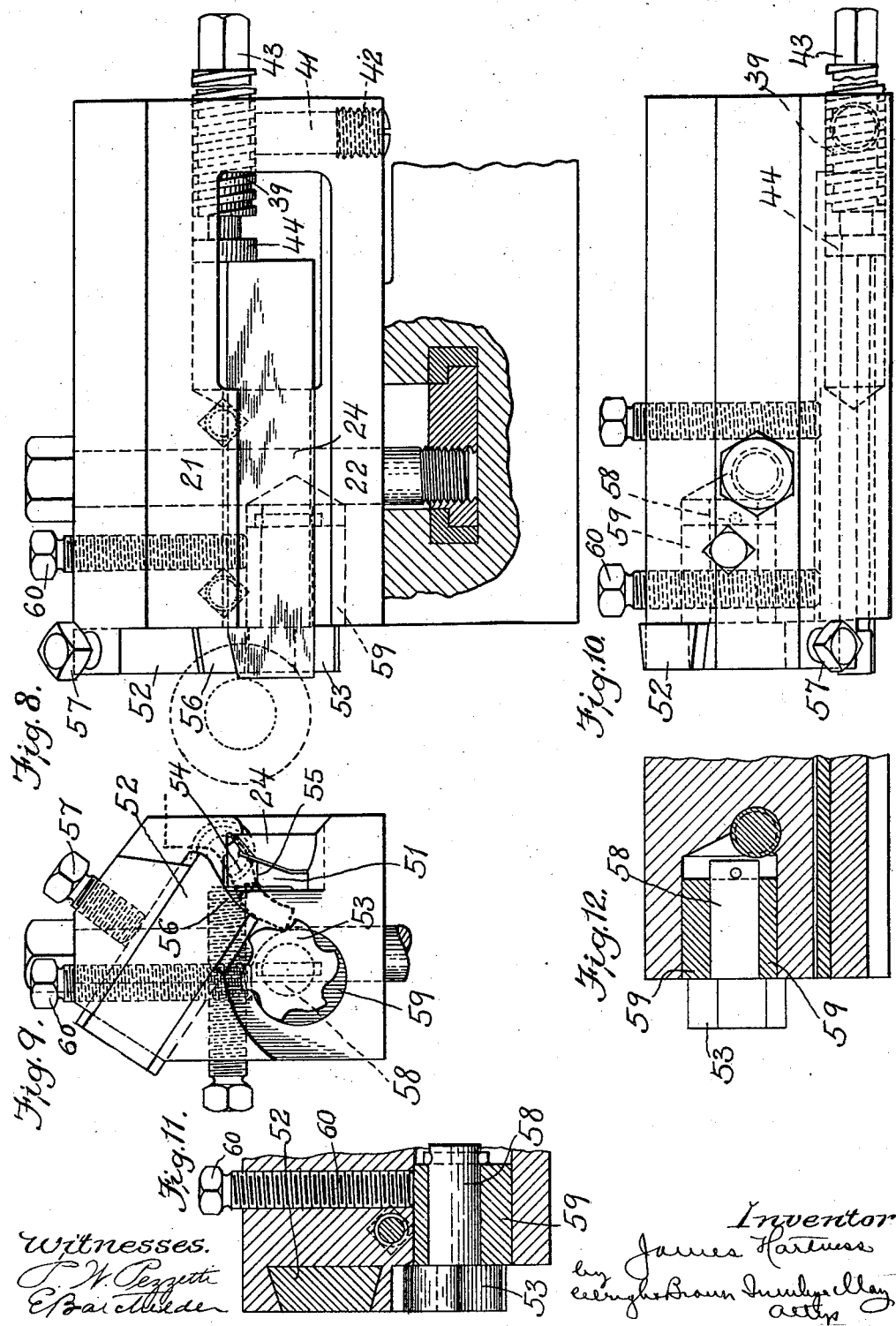
Witnesses.
Inventor:
James Hartness

UNITED STATES PATENT OFFICE.

JAMES HARTNESS, OF SPRINGFIELD, VERMONT.

CHIP-CONTROLLING MEANS FOR METAL-CUTTING TOOLS.

1,036,102.

Specification of Letters Patent.  Patented Aug. 20, 1912.

Application filed September 17, 1908. Serial No. 453,383.

*To all whom it may concern:*

Be it known that I, JAMES HARTNESS, of Springfield, in the county of Windsor and State of Vermont, have invented certain new and useful Improvements in Chip-Controlling Means for Metal-Cutting Tools, of which the following is a specification.

This invention has relation to the art of turning or cutting metal.

In the application for Letters Patent Serial No. 452,308, filed September 9, 1908, I have disclosed a machine-controlled turning tool by which I am able to remove masses of metal from the work without materially changing the molecular structure of the removed metal, this being accomplished by the employment of a wedge-shaped cutter which operates, speaking roughly, to split off the chip instead of crowding, crushing or scraping it off as has previously been done. The metal is thus removed in a ribbon which, contrary to the usual chip, is not made up of a series of chunks of metal more or less firmly united, but forms a substantially continuous tough, laterally strong band. In such case, it becomes necessary to make some disposition of the removed metal and the object of the present invention is to provide means by which the chip may be controlled on leaving the cutting edge. This may be accomplished by an instrumentality which I term a "deflector", and which is employed for breaking the chip in small sections as it leaves the cutting edge. The deflector may serve either by itself or in conjunction with other instrumentalities, as a chip breaker.

According to the diameter of the work and the character of the particular cutter which is employed, and the thickness of the chip which is removed, the chip may be broken by bending it to a point beyond its breaking strength either laterally, that is flatwise of the chip, or else edgewise. That is to say, the chip may be broken by bending it longitudinally of the axis of the work, or else bending it transversely of the work. The breaking in either case is accomplished by locating in the path of the chip one or more deflectors which turns the chip from its natural path at such an angle as will effect its fracture. The deflector or deflectors may be located and formed as circumstances dictate. For instance, the deflector may be formed independently of the tool and be fixed at some convenient point with reference to the cutting edge of the cutter. In some instances, I have found it convenient to locate the deflector at such an angle with reference to the cutter that the chip is broken by bending it over the lower edge of the top slope of the cutter. The extent to which the chip must be deflected in order to effect its breaking, will depend upon the ductility of the metal being turned, together with the thickness of the chip. In turning cast iron, for instance, there is practically no need of a deflector for the reason that the masses of metal which are removed from the face of the work, are broken up in small pieces by reason of the character of the metal. In turning more ductile steel or iron, the chip will sometimes bend to a considerable extent without breaking, in which event the deflector or deflectors must be so located as to insure the chip bending at an abrupt angle sufficient to cause it to break.

I prefer that the deflector or deflectors should be located in any event so that the chip will not be broken from the work at the point of cleavage of the chip from the work, particularly where the deflectors are used in connection with a cutter having a limited oscillation as set forth in my application previously referred to. That is, I prefer that the deflector or deflectors should be so located that the chip will be broken in relatively short lengths, the break occurring at some little distance from the point of cleavage. Of course this will depend upon the character of the deflectors used and the character of the chip being broken, for the reason that, where a chip is being broken edgewise by a deflector located in its natural path, the break is at or near the point of cleavage. This is also true where the deflector forms a part of the cutter itself.

I have not attempted on the accompanying drawings to illustrate all the various forms in which the invention may be embodied, but have selected several characteristic forms which I have found in actual practice to be successfully operative.

Referring to the drawings, Figure 1 represents a portion of a bar or piece of work with a chip being moved by a cutter and the chip being broken by a deflector. Fig. 2 represents a side elevation of a tool embodying the invention. Fig. 3 represents a plan view thereof. Fig. 4 represents an end elevation. Fig. 5 represents a transverse vertical section through the tool. Fig. 6 represents another transverse vertical section through the tool on a different plane. Fig. 7 represents an end elevation of another form of tool embodying the invention. Fig. 8 represents a front elevation of still another embodiment of the invention in which two deflectors are utilized. Fig. 9 represents an end elevation of the same. Fig. 10 represents a plan view of the same. Figs. 11 and 12 represent sections through the tool.

Referring first to Fig. 1, the work which is represented as a bar is indicated at A. The cutter is indicated at B and the deflector at C. It will be noted that the cutter is provided with a cutting edge formed by two faces at an acute angle of substantially 45°, more or less. The top slope or outer face of the cutter is at an obtuse angle to the outer face of the body portion of the cutter so as to form a corner or fulcruming point. In proximity to the cutter is the deflector C which has a face or surface at an angle to the natural path of the chip as it is wedged from the face of the work by the cutter B. The result of this construction and arrangement of parts is that, when the chip engages the deflector, it is diverted from its natural path and bent about the fulcruming point on the tool until finally the strain is so great as to break the portion D of the chip as illustrated in the figure under discussion. The short section of chip which is then connected to the work moves out until it engages the deflector and is then bent beyond its breaking strength until another section is broken off. The deflector may be located as desired, provided it is in the natural path of the chip so as to deflect it therefrom and cause it to break.

In Figs. 2 to 7 inclusive, I have illustrated a tool in which the deflector is located substantially as shown in Fig. 1. In these figures, a holder is shown as indicated at 20. Said holder may be secured by any suitable means to the tool carriage of an engine lathe or to the turret of a turret lathe. Said holder is provided in its face with a groove formed by two forwardly extending parallel flanges 21 and 22. The cutter consists of a bar 23 which is substantially triangular in section. It is provided with an inner face 24 and an outer face or top slope 25 which are at an acute angle of substantially 45°. The top slope of the cutter is at an obtuse angle to the outer face 26 of the cutter so as to form a fulcruming point from which the chip may be broken. It will be observed that the bottom of the tool throughout its length is cylindrically convex and is substantially concentric with the cutting edge, although in actual practice, the cutting edge is slightly inclined as indicated at 27 in Fig. 2. The cutter is placed between the flanges 21 and 22, the former having downwardly projecting lips 28 against which the upper portion of the face 24 rests as shown in Fig. 6. The flange 22 is formed with a concave seat to receive the convex bottom of the tool so as to permit said tool to oscillate more or less about an axis substantially coincident with its cutting edge, in consequence of which the inner face of the cutter may bear against the face of the work without clearance.

The cutter is held against its seat and also against the lips 28 by a flat plate 30, which is located in a seat 31 provided for in the holder. The front edge of this plate is beveled so as to engage the inner face of the shank of the tool as shown in Fig. 6, and it may be forced forward by set screws indicated at 32. The engaging faces of the plate 30 and the cutter are such that, when the plate is forced forward, it tends to force the cutter toward its seat and also to locate it against the lips 28.

For the purpose of limiting the oscillatory movement of the cutter, I provide an abutment screw 33 which may engage the lower portion of the cutter as indicated in Fig. 6. At the end of the holder is formed a transverse dove-tailed guideway 34 for the reception of the deflector 35. This deflector consists of a slide, the inner end of which is curved as at 36, and which lies in proximity to the operative portion of the cutter, as shown in Fig. 5, so as to lie in the natural path of the chip on leaving the top slope of the cutter. The said abutment may be adjusted and held after adjustment by a screw 37 having a collar 38 which engages the end of the abutment as illustrated in the last-mentioned figure. With this construction, in which the parts are located substantially as shown in Fig. 1, the chip on leaving the top slope of the cutter is bent laterally or flatwise at a sufficiently abrupt angle as to effect its fracture in relatively short lengths, such fracture not taking place at the point of cleavage of the chip from the face of the work, but practically at the bottom of the top slope of the cutter. As an instance of construction, it will be seen that the cutter is held against longitudinal movement due to the thrust of the work by a screw bar 39 engaged by a false nut or nut section 40 formed on the upper end of a pin 41 passed upwardly into the holder, said pin being held in place and being adjustable by means of a screw 42. The screw bar 39 is provided at its outer end with an angular head 43 by which it may be rotated for the adjustment of the cutter, and at its inner end with a head 44 engaging the end of the cutter.

Instead of breaking a chip about a fulcrum formed on the cutter, it is quite apparent that it might be broken about a fulcrum formed by some other instrumentality. In Fig. 7, I have illustrated a tool in which two deflectors are utilized, one serving to effect the fracture of the chip about the other as a fulcrum. In this case the two deflectors are indicated at 45 and 46 respectively. The former constitutes an integral part of the holder, while the latter is formed on the clamp which holds the cutter in position. The deflector 45 is formed on the end of the holder in the transverse planes of the operative portion of the cutting edge of the cutter. The deflector 46 consists of the reduced end of a clamp 47 which is located in a seat provided for it in the holder. The deflector 46 has a surface 48 emerging into a rounded corner 49, said surface 48 being at such an angle to the top slope of the cutter as to cause the outward deflection of the chip. The deflector 45 has a surface 50 which may be plane or curved and which is located at an abrupt angle to the surface 48 of the deflector 46. In consequence of this construction, the chip is deflected outwardly by the deflector 46 until its end comes in contact with the face 50 of the deflector 45. As the chip feeds from the work, it is so deflected and bent that it ultimately breaks about the rounded corner 49. The chip is shown in dotted lines, and it will be seen that one section is broken off in the manner described.

In Figs. 8 to 12 inclusive, I have illustrated still another embodiment of the invention in which three deflectors are utilized, one of them being rotatable and another adjustable. These three deflectors are indicated respectively at 51, 52 and 53. The deflector 51 consists of the reduced end of the clamp 54 for the cutter, and it has a surface 55 at an obtuse angle to the top slope of the cutter so as to deflect the chip outwardly. The deflector 52 consists of a slide mounted in a dove-tailed groove in the end of the holder and it has a curved deflecting surface 56 at an obtuse angle to the surface 55 of the deflector 51. The deflector 52 is adjustable longitudinally and may be secured after adjustment by a set screw 57.

The deflector 53 consists of a roll which may be either cylindrical or toothed. As shown I have provided this roll with teeth for a purpose to be explained. The roll is formed on the end of a short shaft 58 which is located in an eccentric aperture in a bushing or sleeve 59, located in a cylindrical socket in the end of the holder. The sleeve or bushing may be rotatably adjusted for the purpose of adjusting the roll, and is held, after adjustment, by a set screw 60. With this construction, the deflector 55 deflects the chip flatwise or laterally from the top slope of the tool toward the deflector 52 which, in turn, deflects it again so that it will come into engagement with the roll or deflector 53. As a result of these deflections, the chip is ultimately broken about the rounded corner of the deflector 51. By providing the deflector 53 with teeth which are spaced apart at some distance as shown, the teeth assist in breaking the chip. The end of the chip comes in contact with one of the teeth and rotates the deflector so that the next tooth engages the chip and bends it about the corner of the deflector 51 so as to effect its fracture.

It is quite apparent that, from the foregoing description, the invention is capable of a variety of embodiments and that the deflectors may be located as circumstances or convenience dictate.

In all of the forms of the invention which I have illustrated, there is a deflecting surface which is sufficiently abrupt with respect to the natural path of the chip to break it in relatively short sections as it is delivered from the rotating metal.

Having thus explained the nature of my said invention and described a way of constructing and using the same although without attempting to set forth all of the forms in which it may be made or all of the modes of its use, what I claim is:—

1. In a metal-turning tool, the combination with a cutter adapted to be fed lengthwise of the work, of a deflector for deflecting the chip removed from the work from its natural path at an angle to cause said chip to be broken.

2. In a metal-turning tool, the combination with an element adapted to be engaged by the chip, of a deflector for bending said chip about said element out of its natural path so as to break said chip.

3. In a metal-turning tool, the combination of a wedge-shaped cutter adapted to be fed lengthwise of the work and a chip breaker located at the side of said cutter and formed and arranged with reference to the cutter to deflect the chip formed thereby from its natural path and to break it into short sections.

4. In a metal-turning tool, the combination with a cutter, of a plurality of deflectors having opposing surfaces for bending the chip removed by the cutter first in one direction and then in another so as to break it.

5. In a metal-turning tool, the combination with a cutter, of a plurality of deflectors for bending the chip removed by the cutter so as to break it, and means for rotatably supporting one of said deflectors.

6. In a metal-turning tool, a support, a cutter adapted to be fed lengthwise of the work and arranged on said support and having a cutting edge, and a deflector on said support separated from said cutter to allow the chip to pass between them, said deflector being so located with respect to the natural path of the chip as to break it into sections.

7. In a metal-turning tool, a support, a cutter thereon adapted to be fed lengthwise of the work and consisting of a bar or shank having a longitudinal cutting edge, and a chip-breaking deflector separated from said cutter to allow the chip to pass between them, and having an abrupt surface to bend said chip out of its natural path sufficiently to break it into sections.

8. In a metal-turning tool, a cutter having a longitudinal cutting edge, a support on which said cutter is mounted, and a deflector mounted on said support beside but separated from said cutter to bend said chip from its natural path.

9. In a metal-turning tool, a holder, a cutter thereon, a fulcrum and a deflector separated from said fulcrum to provide a space for the reception of a chip from said cutter, said deflector having a surface at an angle to the natural path of the chip to bend said chip about said fulcrum and break it into short sections.

10. In a metal-turning tool adapted to be fed lengthwise of the work when the latter is rotating, a cutter consisting of a bar having on its sides an inner face and a top slope forming a cutting edge lengthwise of said bar, and a deflector separated from said top slope to permit the chip to pass between them, said deflector having a surface to force the chip out of its natural path to a breaking angle.

11. In a metal-turning tool, a cutter consisting of a bar having on its sides an inner face and a top slope forming a cutting edge lengthwise of said bar, a fulcrum located with reference to said cutting edge to permit the chip to ride over it, and a deflector spaced from said fulcrum to permit the passage of the chip between them, said deflector having a chip-engaging surface abrupt to the natural path of the chip.

12. In a metal-turning tool, a cutter adapted to be fed lengthwise of the work and consisting of a bar having a lengthwise cutting edge, a deflector located by the side of the bar adjacent said cutting edge but separated therefrom to receive between them the chip produced by the cutter, and abrupt to the natural path of the chip to bend it to a breaking angle, and a support for said cutter and said deflector.

13. In a metal-turning tool, a support, a cutter seated on said support and having a lengthwise cutting edge, oppositely arranged deflectors separated to permit the passage of the chip and located at the side of said cutter but adjacent said cutting edge, said deflectors having chip-breaking surfaces for bending the chip first in one direction and then in the other.

In testimony whereof I have affixed my signature, in presence of two witnesses.

JAMES HARTNESS.

Witnesses:
FRED B. GILL,
J. W. WALKER.